(12) United States Patent
Lusher et al.

(10) Patent No.: US 7,418,482 B1
(45) Date of Patent: Aug. 26, 2008

(54) WEB-BASED TASK ASSISTANTS FOR WIRELESS PERSONAL DEVICES

(75) Inventors: Elaine P. Lusher, Pleasanton, CA (US); Charles C. Earl, Stanford, CA (US); Sandy Metzger, Reston, VA (US); Carl Schuyler, Miami, FL (US)

(73) Assignee: PalmSource, Inc., Sunnyvale, CA (US)

( * ) Notice: Subject to any disclaimer, the term of this patent is extended or adjusted under 35 U.S.C. 154(b) by 1448 days.

(21) Appl. No.: 09/861,051

(22) Filed: May 17, 2001

(51) Int. Cl.
*G06F 15/16* (2006.01)

(52) U.S. Cl. .................... 709/219; 709/217; 709/218

(58) Field of Classification Search ......... 709/201–203, 709/217–219, 227–228, 230, 248, 250; 705/26
See application file for complete search history.

(56) References Cited

U.S. PATENT DOCUMENTS

| | | | | |
|---|---|---|---|---|
| 6,167,568 | A * | 12/2000 | Gandel et al. ............. | 717/176 |
| 6,480,711 | B1 * | 11/2002 | Guedalia .................. | 455/412.1 |
| 6,603,984 | B2 * | 8/2003 | Kanefsky .................. | 455/566 |
| 6,901,429 | B2 * | 5/2005 | Dowling .................. | 709/203 |
| 2002/0010758 | A1 * | 1/2002 | Chan ....................... | 709/218 |
| 2002/0026413 | A1 * | 2/2002 | Wu .......................... | 705/39 |
| 2002/0059105 | A1 * | 5/2002 | Maeda et al. ............. | 705/26 |
| 2002/0133545 | A1 * | 9/2002 | Fano et al. ................ | 709/203 |
| 2002/0165988 | A1 * | 11/2002 | Khan et al. ............... | 709/246 |

* cited by examiner

Primary Examiner—Krisna Lim
(74) *Attorney, Agent, or Firm*—Berry & Associates P.C.

(57) ABSTRACT

The present invention relates to a method for enhancing the use of a computer network which is accessed by use of a wireless device. Specifically, one embodiment of the present invention pertains to a method of using server-resident software assistants, programs to assist the wireless device user, to perform a significant amount of the tedious input tasks required when wireless devices such as PDAs attempt to exploit the services available on the Internet. The method provides a mechanism by which software assistants can be programmed to a users' own specific information and ways of performing tasks that exploit Internet services such as purchasing, information searches, event planning and complex scheduling. The task can be organized in structural task lists that interface with a user's stored preferences and PIM information on the portable electronic device.

18 Claims, 11 Drawing Sheets

| NAME | PARAMETERS | SEMANTICS |
| --- | --- | --- |
| Initiate | Task-ID, Data =T | The PAS initiate a task based on description T. |
| Reply | Task-ID, Msg-ID | Return results of the action initiated in the specified message id. |
| Update | Task-ID, Data | Change the values of the task parameters as given in Data. |
| Suspend | Task-ID | Suspend the task |
| Activate | Task-ID | Reactivate the task |
| Query | Task-ID, Data | Get the value of the task parameters specified in data |
| Add | Task-ID, Data | Add the following parameter to the task description. |
| Modify | Task-ID, Data | Modify the value of the task parameter. |
| Delete | Task-ID, Data | Delete the following task parameter. |
| Fail | Task-ID, Msg-ID | The action initiated in msg-id failed. |

WEB-BASED TASK ASSISTANTS FOR WIRELESS PERSONAL DEVICES

FIELD OF THE INVENTION

The present invention relates to a method for using web-based task assistants to reduce the user task load when communicating with the Internet by a wireless device.

BACKGROUND OF THE INVENTION

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." By virtue of their size, palmtop computer systems are also lightweight and so are exceptionally portable and convenient. As a result, palmtops are readily carried about in a briefcase or purse, and some palmtops are compact enough to fit into a person's pocket. Further development of PDAs has enabled their use for portable, and now wireless, access to computer networks and the World Wide Web. The portability and convenience makes such devices ideal for such wireless access when the user is away from a wired workstation.

On the other hand, because they are relatively small, the displays on PDAs or palmtops are necessarily limited in their ability to present information from many websites and the speed of entering information into an interactive window is necessarily slow. Most limiting, however, is the narrow communication band-width currently available to these convenient devices.

The area in which PDAs and palmtops excel is in the area of personal information management (PIM). Most operating systems in palmtops are extremely well adapted, incorporating personal information managers (PIMs) in the basic collection of permanent applications.

On wireless PDAs, the integration of PIM data with the world-wide-web is tightly concentrated in a few areas, such as synchronization of a personal calendar with a web-based calendar or in placing a phone call. Current web browsing mechanisms on wireless PDAs also burden the user with deciding what kind of information is needed, where to retrieve information, how to aggregate information from multiple websites, and how to utilize the information to aid in a given task. These limitations are further aggravated by limited bandwidth and lack of adequate input methods.

What is required, then, is a mechanism for providing a better Internet experience for a user that relieves user input demands and increases output effectiveness. Such a mechanism should efficiently use the limited bandwidth available between wireless devices and their web portals, whether implemented as proprietary cellular networks or other, non-proprietary, portals.

SUMMARY OF THE INVENTION

Accordingly, embodiments of the present invention are directed to a method of augmenting user input to accomplish personal, task-oriented, web interaction that relieves user input demands and increases output effectiveness. This novel system also relieves the computational burden on wireless devices and conserves limited bandwidth between wireless devices and their web portals, whether implemented as proprietary cellular networks or other, non-proprietary, portals.

The present invention provides direct launching of Internet tasks from existing PIM applications; allows task personalization using PIM data; and allows a user to manage multiple tasks in support of a single goal.

The present invention relates to a method for enhancing the use of a computer network which is accessed by use of a wireless device. Specifically, one embodiment of the present invention pertains to a method of using server-resident software assistants, programs to assist the wireless device user, to perform a significant amount of the tedious input tasks required when wireless devices such as PDAs attempt to exploit the services available on the Internet. The method provides a mechanism by which software assistants can be programmed to a users' own specific information and ways of performing tasks that exploit Internet services such as purchasing, information searches, event planning and complex scheduling. The task can be organized in structural task lists that interface with a user's stored preferences and PIM information on the portable electronic device.

Embodiments of the present invention include a method for enhancing wireless access to a computer network which includes the steps of: gaining access to the computer network using of a portable computing device, selecting a task a list of performable tasks in the operating system and autonomously executing the task in the computer network by the use of a software task assistant.

BRIEF DESCRIPTION OF THE DRAWINGS

The operation of this invention can be best visualized by reference to the drawings.

SPECIFICATION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

DETAILED DESCRIPTION

Described herein is a new method for greatly enhancing users' access to the multitude of services available on the Internet when using wireless devices. One embodiment uses personal data assistants (PDAs) that are wirelessly connected to the Internet. The preferred means of connection is by an RF interface or some other means of allowing full, two way, wireless, data communication between the Internet, or a server in it, and the PDA. Specifically, the preferred embodiment of the present invention pertains to a method of using software agents or task assistants, resident in the network infrastructure, to accomplish interaction-intensive tasks without a high interactive demand on the user.

In the description of the embodiment herein, the terms "wireless device", "portable computing device", "palmtop computer", "handheld computer" and "personal data assistant", or PDA, are used interchangeably. In every case the terms refer to any portable wireless device used to access the Internet.

Figure 1:
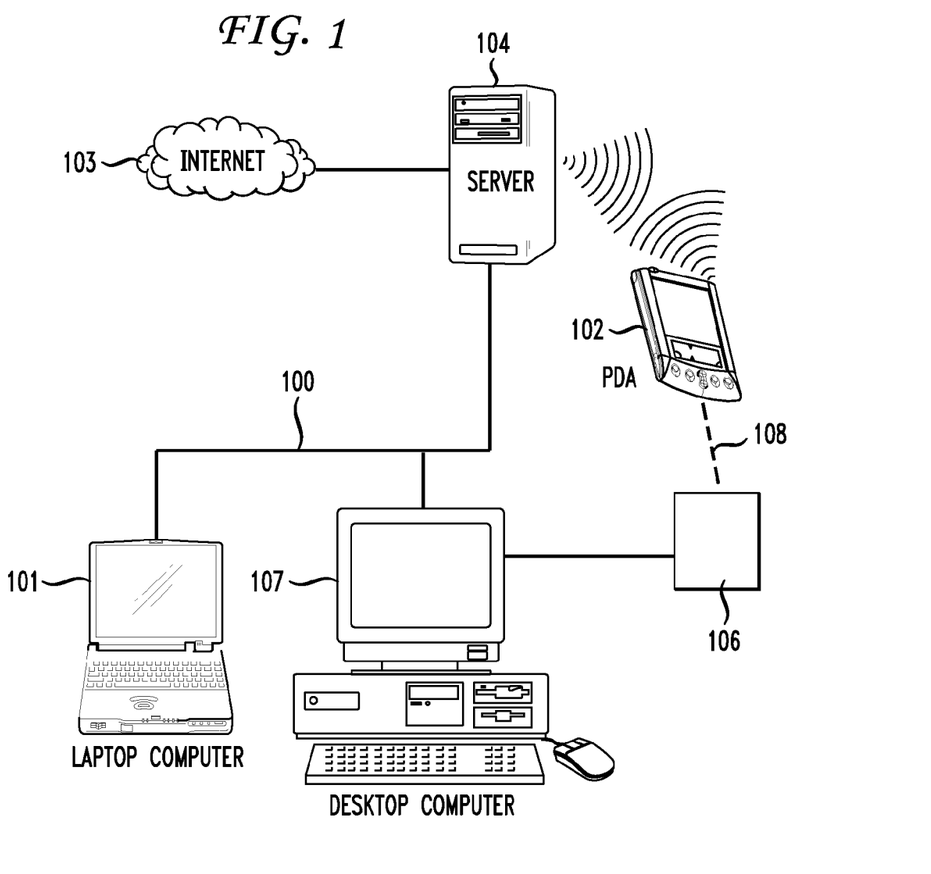
FIG. 1 illustrates a typical network environment in accordance with one embodiment of the present invention.

FIG. 1 illustrates a typical computer network in which access is gained by wireless portable computing device, in this embodiment a PDA, as well as other means. Local Area Network (LAN) connection 100 connects laptop computer 101 with server 104 and desktop computer 107. Server 104 is connected to Internet 103 and, by wireless connection 105, to PDA 102. PDA cradle 106 is shown as an example of an alternative means for the PDA to connect with the network via coupling 108. In either case, server 104 serves as the web portal for PDA 102. It must be remembered that the embodiment of the present invention discussed herein specifically addresses wireless access to the Internet.

It must also be noted that a wireless Internet connection in this embodiment of the present invention is not limited to implementation in a local area network. Internet connection can also be envisioned as being directly attained through a wireless Internet Service Provider (ISP).

Figure 2:
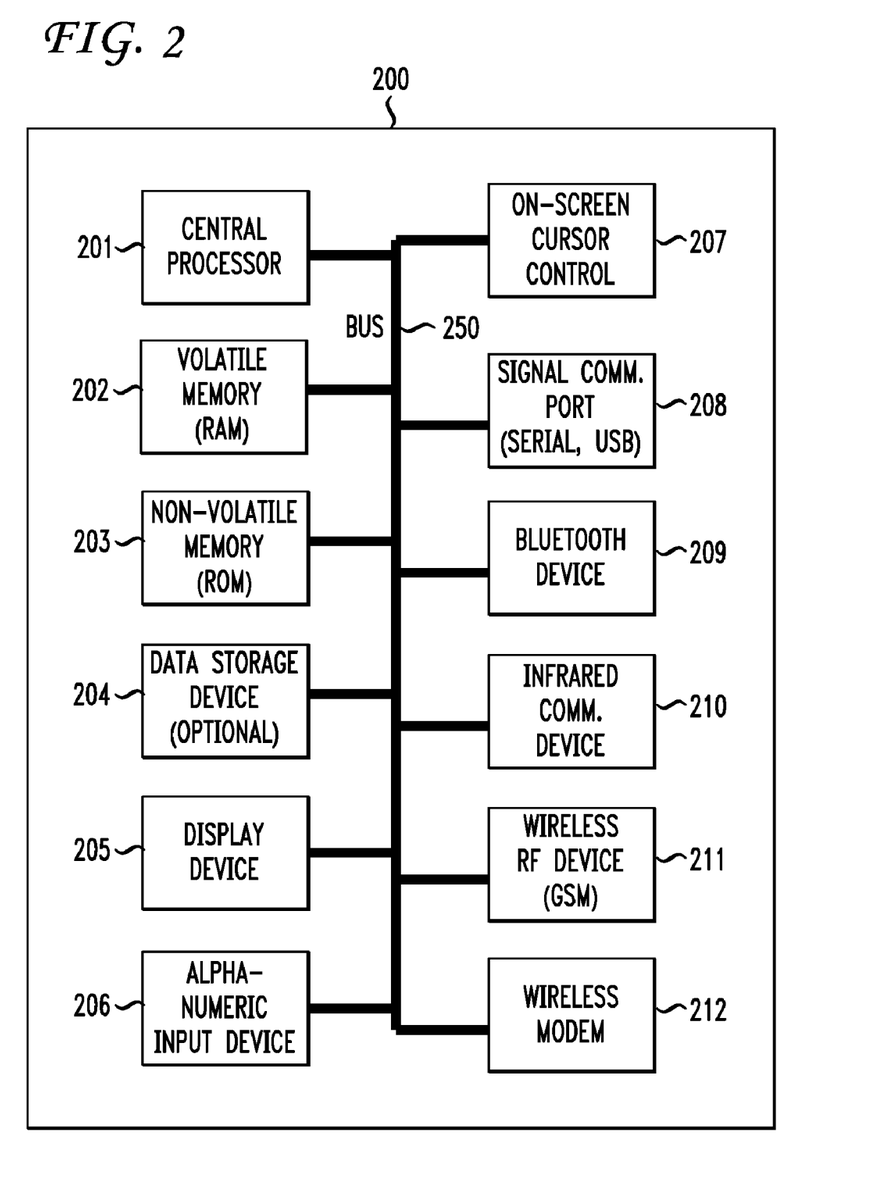
FIG. 2 is a block diagram illustrating an embodiment of a portable computer system in accordance with the present invention.

FIG. 2 illustrates, in block diagram, the configuration of a typical portable computing device or PDA consistent with this embodiment of the present invention. The block diagram is also consistent with a palmtop computer. Computer system 200 includes address/data bus 250 for communicating information, a central processor 201 coupled with bus 250 for processing information and instructions, a volatile memory 202 (for example, random access memory RAM) coupled with bus 250 for storing information and instructions for the central processor 201 and a non-volatile memory 203 (for example, read only memory or ROM) coupled with bus 250 for storing static information and instructions for processor 201. Computer system 200 also includes optional data storage device 204 (for example, thin profile removable memory) coupled with bus 250 for storing information and instructions. Device 204 can be removable. As described above, system 200 also contains a display device 205 coupled to the bus 250 for displaying information to the computer user. Also included in computer system 200 of FIG. 2 is alphanumeric input device 206 which, in one implementation, is a handwriting recognition digitizer pad. Device 206 can communicate information (spatial data and pressure data) and command selections to central processor 201. In another implementation, alpha-numeric input device 206 is a removable keyboard which can be attached to signal communications port 208.

System 200 also includes an optional cursor control or directing device 207 coupled to the bus for communicating user input information and command selections to central processor 201. In one implementation, device 207 is a touch screen device (also a digitizer) incorporated with display 205. Device 207 is capable of registering a position on display 205 where a stylus makes contact as well as the pressure of the contact. The digitizer can be implemented using well known devices, for instance, using the ADS-7846 device by Burr-Brown that provides separate channels for spatial stroke information and pressure information.

Any of a number of display technologies can be used for flat panel display 205.

Display device 205 may be a liquid crystal device (LCD), cathode ray tube (CRT), field emission device (FED, also called flat panel CRT) or other display device suitable for creating graphic images and alphanumeric characters recognizable to the user. In one embodiment, display device 205 is a flat panel multi-mode display capable of both monochrome and color display modes.

Further included in computer system 200 is signal communication device 208 which is also coupled to bus 250. Communication device 208 can be implemented as a serial port (or USB port) for communicating with a cradle (106 in FIG. 1). In addition to device 208, wireless communication links can be established between the device 200 and a host computer system (or another portable computer system) using a Bluetooth wireless device 209, an infrared device 210, or a GSM radio device 211. System 200 may also include a wireless modem device 212 and/or a wireless radio, for example, a GSM wireless radio with supporting chipset. Wireless modem device 212 is coupled to communicate with processor 201 but may not be directly coupled to port 208.

In one implementation, the Mobitex wireless communication system may be used to provide two way communication between system 200 and other networked computers and/or the Internet via a proxy server. In other embodiments, TCP protocol can be used or SMS can be used. System 200 of FIG. 2 may also contain batteries for providing electrical power. Replaceable cells or rechargeable batteries can be used. Well known electronics may be coupled to the battery to detect its energy level and this information can be sampled by processor 201.

Figure 3:
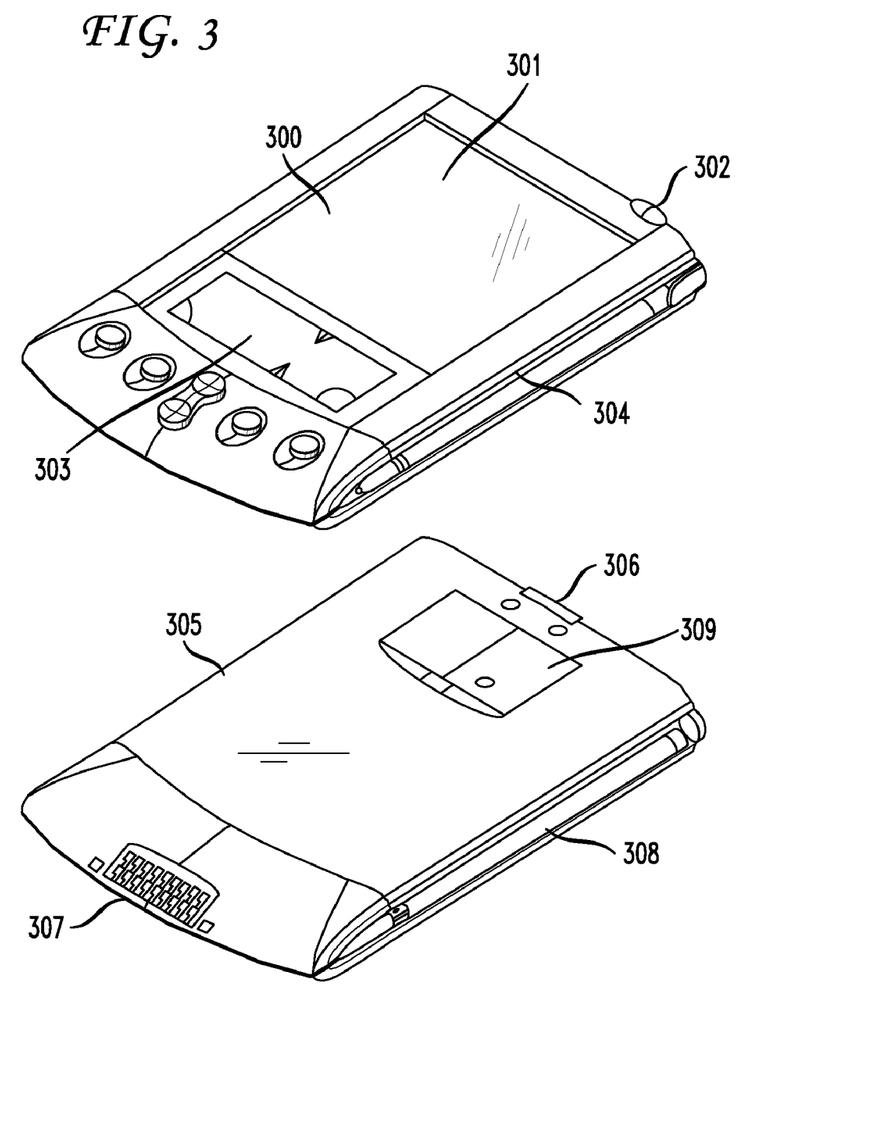
FIG. 3 illustrates a physical embodiment of a portable computer system in accordance with one embodiment of the present invention.

The category of portable computing devices can include "palmtop" computers and PDAs. A typical palmtop computer that can be used in various embodiments of the present invention is shown in FIG. 3, in top and bottom views. Referring also to FIG. 2, panel 301, in top view 300, integrates display device 205 and, when touched with stylus 304, cursor control 207. Alpha-numeric input 206 is via input panel 303. Power to the device is applied when on/off button 302 is depressed. Connection to a network can be implemented either through RF connection 211, using extendible antenna 308, or by infrared (IR) connection. IR connection 210 is implemented in this illustration by IR window 306 which is shown on bottom view 305. Connector array 307 provides the capability for wired connectivity to a desktop computer and thence a network by the use of a cradle. Although implemented in this embodiment as serial port 208, wired connectivity via connector 307 could also alternatively be any of a number of well known communication standards and protocols, for example, parallel, SCSI (small computer system interface), Firewire (IEEE 1394), Ethernet, etc. A battery storage compartment door 309 is also shown.

Figure 4:
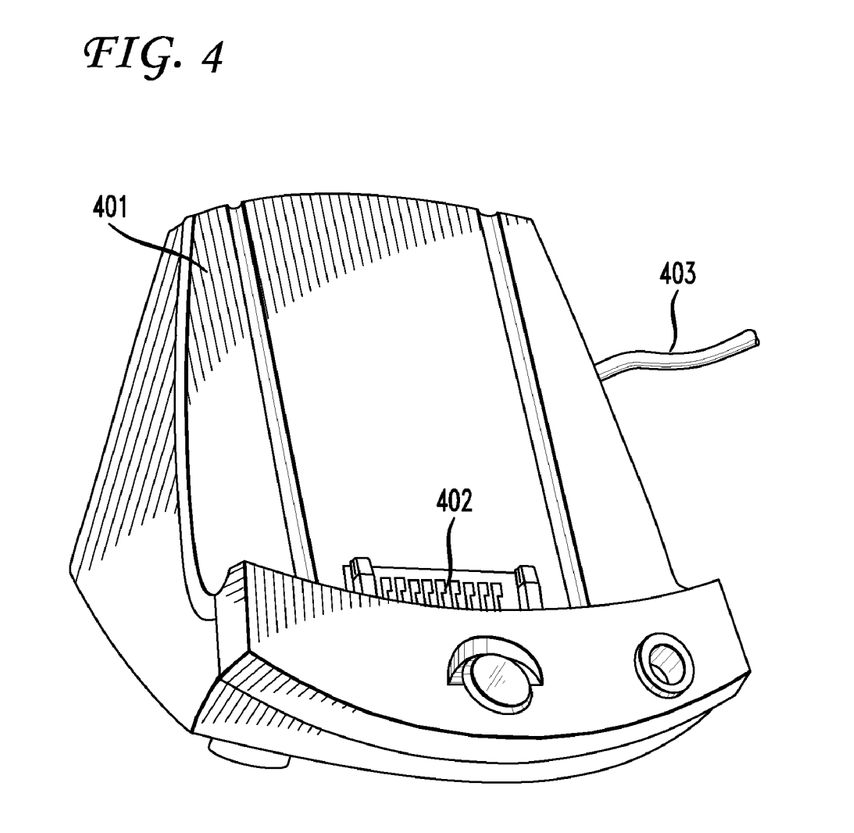
FIG. 4 illustrates a cradle for an alternative hard-wired connection of a typical portable computing device in accordance with one embodiment of the present invention.

A typical cradle is illustrated in FIG. 4. The PDA is set in base 401 which causes contact between the PDA's connector array 307 and the cradle connector array 402. Array 402 is, in this embodiment, the terminus of serial cable 403 which connects the desktop computer's serial bus (208 in FIG. 2, 307 in FIG. 3).

More and more, Internet access is gained by the use of wireless devices and PDA's. Current generation PDAs contain Personal Information Management (PIM) applications, such as calendars and address books, as well as wireless Internet access. Typically, web browsers are not tightly integrated with PIM functions. Users commonly use a calendar, address book, or expense reporting application to manage their personal information, and some form of web browsing to accomplish web interaction. Current PDA-based browsers typically display only a small subset of any given web page, because of screen size restrictions, but still adhere to the "web browsing" paradigm: users must know what information they want and what websites they must access to retrieve the desired information.

Further, many PDA-based web browsers make only a subset of the web available, since most website content must be preprocessed to be satisfactorily viewed on small form factor devices. The interest in this embodiment of the present invention is in enhancing the integration of PIM applications into web interaction. This embodiment envisions a use model in which the user can create and manage PIM information, but use the web to augment task accomplishment. The focus, for the purpose of illustration of the concepts presented in this embodiment, is on an application common to many PDAs: the "TO DO" list. This application is inherent in the most popular PDA platforms and is an unstructured free-form list of tasks the user wishes to accomplish. It commonly provides a numbered blank page on which the user is required to hand write using a restricted form of text input sometimes called "Graffiti". This embodiment of the present invention provides web-based assistance for such applications as a TO DO list.

Combining existing PIM information, user preferences, and web-based assistants, as is done in this embodiment, yields an effective electronic assistant that can aid the user in the accomplishment of real-world tasks. Specific applications that could benefit from this approach include Search, E-Commerce, and Event Scheduling.

Requirement for Web-Assisted PIM Tasks

The implementation of a web-based, software, task assistant, such as presented in this embodiment of the present invention, requires that a number of requirements be satisfied in order to achieve satisfactory web-based applications on a mobile device. These requirements include: Reduced user input burden, New Web Interaction Paradigms, Battery Conservation and Ease of use.

Many classes of transactions typically require more than a single piece of input from the user. An examples of required text input during an online purchase include account number, password, and shipping address. The burden of user input in this embodiment is relieved such that applications such as those in "E-Commerce" are both easy to conduct and error-free from a mobile device. This is not only critical for "E-Commerce" activities with urgency such as booking airline tickets in mobile locations (e.g., change a flight while riding in a taxi), but also important for a range of applications because input devices such as the stylus commonly used in a palmtop device are less than ideal for extensive user input.

Currently, web interactions involve a lot of browsing among available websites. Browsing is not an effective form of user interaction on a palmtop device, as it can be labor-intensive and costly in terms of time spent and time wasted. Some existing schemes that preprocess content to address this problem only make a small subset of the web available to users of mobile devices. Web-based assistants, as presented herein, can offload some intermediate activity and help to ferret out the set of content that is relevant to the user's task.

If PIM tasks are augmented with web assistance, computationally-intensive, bandwidth-eating, battery-draining, operations can be offloaded from a mobile device. Also, operations such as search may produce higher accuracy results if several different techniques are used to find relevant information, rather than a single technique. Several parallel searches can be invoked via web assistants which each use different methodologies to find a result, and the results can optionally be aggregated or filtered to produce a single best result. Such offloading invokes such bandwidth-intensive operations at the server/agent level where bandwidth speeds are much higher, rather than at the mobile device.

The current modes for accomplishing the above classes of tasks on a palmtop device demand a great deal of concentration, manual dexterity, and time, from the user. For complex tasks that require the accomplishment of several sub-tasks, web assistants can bundle together the results of each subtask so that a given task can be accomplished by the user without invoking multiple individual applications or multiple website visits. Examples of such tasks include online shopping, which typically involves browse, content fetch, and buy tasks.

Classes of Web Assisted PIM Tasks

Classes of web-access tasks that can benefit from this embodiment of the present invention include: Information Retrieval/Search, Monitor, Listen, Communicate, "E-Commerce", Schedule, Plan, and Act. Each of these classes involves some similar and some different operations.

Information Retrieval/Search involves the ability to filter web content based on search criteria and present useful results to the user. Search results are improved by the use of several different search methodologies and the comparison or aggregation of their results. In addition, new search technologies can be flexibly accommodated via web assistants, because such techniques are launched from a server as they become available. This launch is transparent to the user unless the user chooses to explicitly override it via stated user preferences. The ability to pre-fetch web information on behalf of the user based on preferences can also be useful.

Monitoring involves periodically checking one or more websites to determine if some new information has been added to the content. Common examples include monitoring a financial site for the change in a stock price, monitoring a news site for an announcement, or checking a movie listing for playing times of a newly released movie. An agent can perform this activity on behalf of a user. This capability can also support more complex tasks such as those involved in "E-Commerce" and Planning.

Listening tasks revolve around applications such as sampling music, attending voice conferences, or attending online lectures. These tasks may be bundled as subtasks in another task (e.g., buy) or remain standalone.

Communication is a fundamental part of many other tasks, as well as a standalone task in its own right. Some examples of communications options include placing a voice call, email, FAX, or send a message via a Short Messaging System. These communication options can also be expressed as preferences. Web-based voice calls can be placed directly from a PDA, given appropriate enabling hardware. The Communicate task is also an important subtask of Planning and Scheduling activities. The Communicate task allows the user to select a person to arrange an appointment with as well as a communication type. For example, if the user selects an email address (from the address book), various options for time, date, location can be presented (using the calendar application). An email generation application could be implemented that automatically sends email to the other party requesting an appointment and containing the user-specified variables.

"E-Commerce" is the name given to all those operations that are done online when shopping, selecting, purchasing, receiving, presenting, selling, or delivering products on the Internet. "E-commerce" typically involves several discrete tasks, such as browsing, price comparison, and purchase. Much of the pre-purchase activity can be done via an agent that locates relevant information (e.g., product reviews) and purchase options.

The nature of scheduling tasks can range from simple (e.g., schedule a meeting) to multi-task scheduling. In the latter task, several different scheduling tasks, such as arranging flight reservations and hotel reservations, can be bundled together to achieve a larger task, with some form of web assistance available for each scheduling task. Such tasks typically have interdependencies that must be observed when invoking web-based assistance. In the case of multi-task scheduling, interdependencies between the subtasks are accommodated. The simplest of these tasks could be characterized as single-event-single-actor events.

An example would be finding a movie. There are no other events or people to coordinate with, but there may be supporting information retrieval (what movies are showing) and "E-Commerce" transactions (purchasing the ticket in advance) to consider. Another category might be to multiple-event-single-actor. An example would be planning dinner and a movie. This kind of task involves negotiating multiple constraints (how close should the restaurant be to the theatre, is it more important to find an acceptable movie or an acceptable restaurant, etc.) Another category would be multiple-event-multiple-actor scheduling. For this type of task, a communication event could be use to ask another person to participate in the activity.

Tasks of type Plan may share subtasks with Scheduling tasks, but could be more complex. For example, user preferences and multiple constraints could be involved, making the planning difficult or even potentially impossible to achieve. Examples include any planning that has severe time restrictions, involves coordinating a large number of persons, or requires considering many factors (e.g., price, location, time, . . . ). In that case, the user would need to be queried about alternatives, thereby lowering the potential effectiveness of web-based assistance.

The important distinction between the Act task and others is that an agent has to actively monitor events that might affect the activity as it's underway (e.g., flight delays in a travel schedule) and then alert the user when there are important changes (opportunities or failures) in the activity parameters.

In addition to supporting a range of task classes, this embodiment of the present invention supports preference-based web interaction. Preferences can range from simple variables, such as favorite websites, to more complex preferences, such as travel preferences that encode a variety of variables, including cost (e.g., cheapest flight), hotel proximity to airport, and preferred rental car company: At a minimum, content filtering could be performed to observe simple user preferences. Examples of such filtering include toggling images or controlling the volume of information delivery (e.g., news headlines, not full text articles) to conserve bandwidth and cut costs. More sophisticated examples of content filtering include selectively deleting irrelevant content based on stated user preferences. Two levels of preferences can be defined. Simple preferences can be expressed formally as quadruplets, named here as Predicate, Variable, Value, Importance. The variable is some task specific parameter (e.g., for E-Commerce, one variable might be "CreditCardNumber").

The Value parameter is the value associated with the variable parameter. In the case of a credit card, it would be the actual number. Here Predicate is a relation on Value and Variable. In the above case, the relation would be equality. The Importance would be a number that expresses how important it is that the constraint be met. In executing the task, the agent uses rules, optionally does utility calculations based on the importance values, that allow it to make decisions on variable bindings (e.g., whether to use the visa or MasterCard on a particular transaction) and other actions (e.g., whether to gather more information about a site before sending credit card information). Simple preferences can be represented in this form and there is equivalence between this and the preference representation that will be used in the Active To Do List application discussed below. Alternatively, more complex preferences could be expressed as rules. One example would be allowing the user to state something like "If the item about to be purchased is less than $5.00 and the agent has spent less than $20.00, then it is ok to make a purchase automatically on my behalf".

Formal Characterization of Web Assisted PIM Tasks

A web assisted PIM task, in this embodiment of the present invention, is formally defined by a record of the form:

$T(ID, G(I, p_1, p_2, \ldots, p_n), H(u_1, u_s, \ldots, u_n), C(c_1, c_2, \ldots c_n), R(r_1, r_2, \ldots, r_n))$ Or $T(t_1, t_2, \ldots, t_n)$ Where ID is an identifier uniquely identifying the particular task, the $G(I, p_1, p_2, \ldots, p_n)$ represents a task with goal G, and I is the label or index of that goal, and $p_1, p_2, \ldots, p_n$ are the goal's parameters (i.e. variables and associated bindings). The set $H(u_1, u_s, \ldots, u_n)$ constitutes the history of the task and is composed of the websites visited during the execution of the task. The set $C(c_1, c_2, \ldots, c_n)$ is a set of constraints $c_i$ on the parameters $p_i$ of the task. These are used to express preferences. Each preference is formally expressed as a "4-tuple" (predicate, variable-name, value, importance). Variable-name is some task specific parameter (i.e. one of the $p_i$.). Value is just a value associated with that parameter. Predicate is some relation on Value and Variable-name. Importance is a number to express how important it is that the constraint be. The PIDL language is used to express constraints in this implementation. The set $R(r_1, r_2, \ldots, r_n)$ constitutes a set of returned results for the task. The alternative expression of a task $T(t_1, t_2, \ldots, t_n)$ models tasks that have a set of subtasks $t_1, t_2, \ldots, t_n$ each of which is a task.

Once a task has been defined on the PDA, it is transmitted to the web-based assistant, i.e. the PAS. Each message between PDA and PAS is of the form:

M(Cmd, Task-ID, Msg-ID, Originator, Recipient, Data); where,

Cmd is a message from an Originator (i.e. PAS or PDA) to a Recipient (i.e. PDA or PAS). Task-ID and Message-ID uniquely identify the task and message respectively. Data is a complete or partial description of a task. The structure of a Data object can be described by a simple grammar as partial description of a task. The structure of a Data object can be described by a simple grammar as:

Data:: = TaskDescriptorElement*

Figure 11:
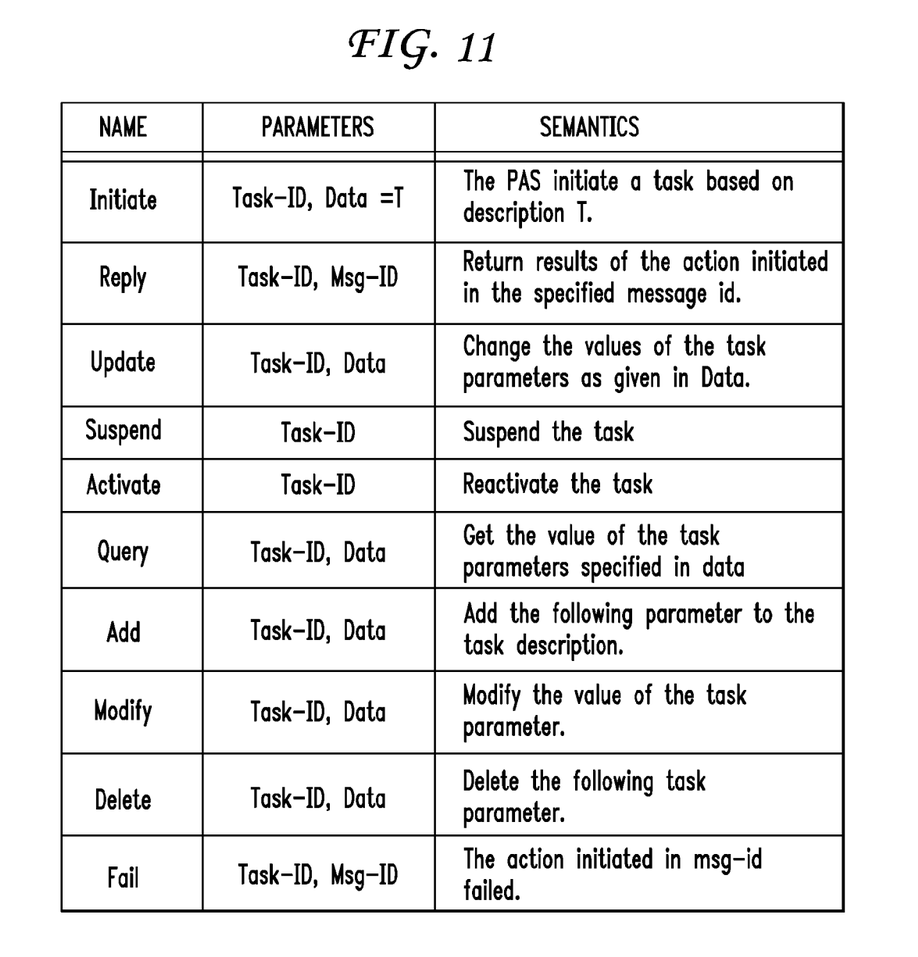
FIG. 11 is a table of definitions of command types in accordance with an implementation of one embodiment of the present invention.

TaskDescriptorElement:: =$G(p_1, p_2, \ldots, p_n)|H(u_1, u_s, \ldots, u_n)|C(c_1, c_2, \ldots, c_n)|R(r_1, r_2, \ldots, r_n)$ That is, the Data portion of the message is an optional set of one or more of the elements of the complete task descriptor of a task. These are the portions of the task descriptor that Cmd operates on. A description of the types of commands is given in the table in FIG. 11.

Web Assistance for to do List Application

The TO DO List application, as it currently exists in one potential application for this embodiment of the present invention, is entirely free form and serves only as a reminder list. This embodiment enforces some structure on the TO DO list such that the user chooses from tasks which could benefit from web assistance. Examples include: search, shop, monitor, listen, schedule, communicate, plan, and act. This structure accomplishes several objectives: it defines the set of menu-based operations for which a user can receive web-based assistance, it limits the input the user must enter, and it provides structure for the task details so that web-based assistance can be invoked.

In this application of this embodiment, the user selects a task (e.g., shop for a CD) from a menu. The parameters describing the task (e.g., which CD to shop for) along with applicable preferences (e.g., which CD websites to visit, how to rank search results, how many bytes to limit transmissions to) will be used to generate a task description.

Figure 5:
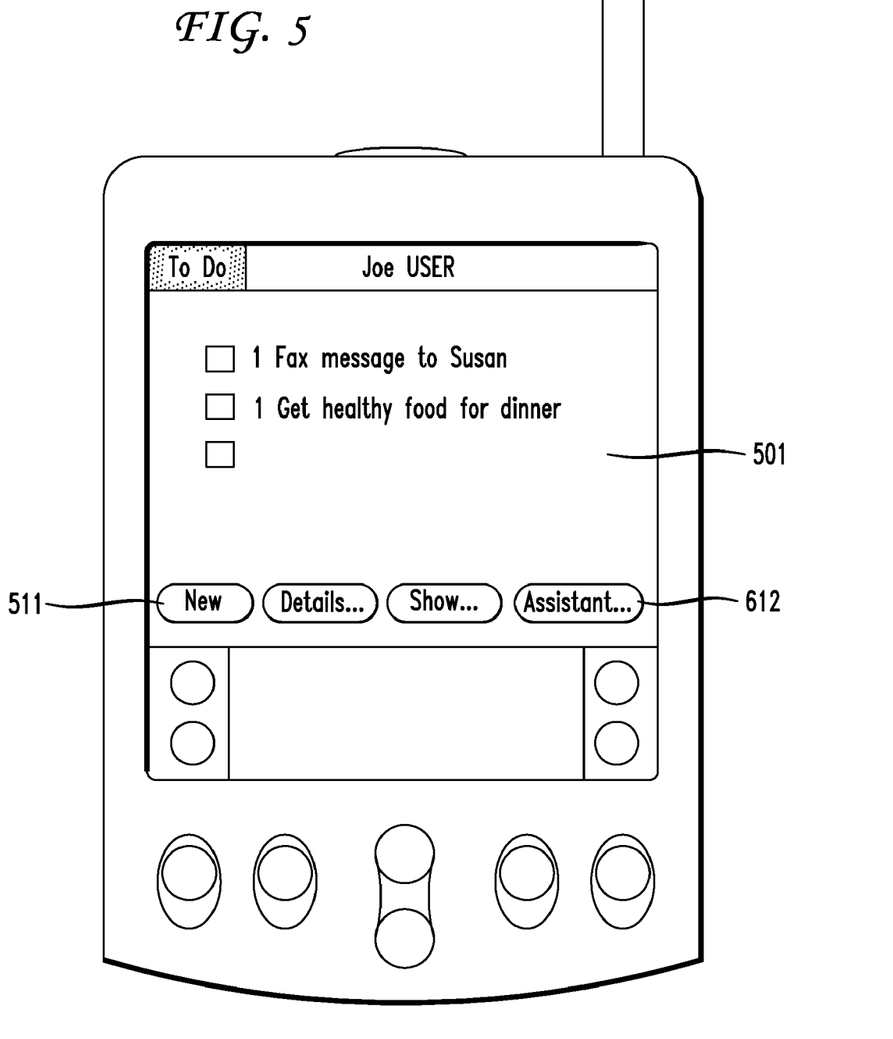
FIG. 5 illustrates one possible implementation of a display in accordance with one embodiment of the present invention.

The user begins by launching the To Do List application. A display, such as example 501 shown in FIG. 5, would be presented and would elicit user input. When clicking the appropriate button, "New" button 511 in this embodiment, a To Do List item would be created. The user begins definition of the task by clicking the "Assistant" button 612 at the bottom of the To Do List window.

Figure 6:
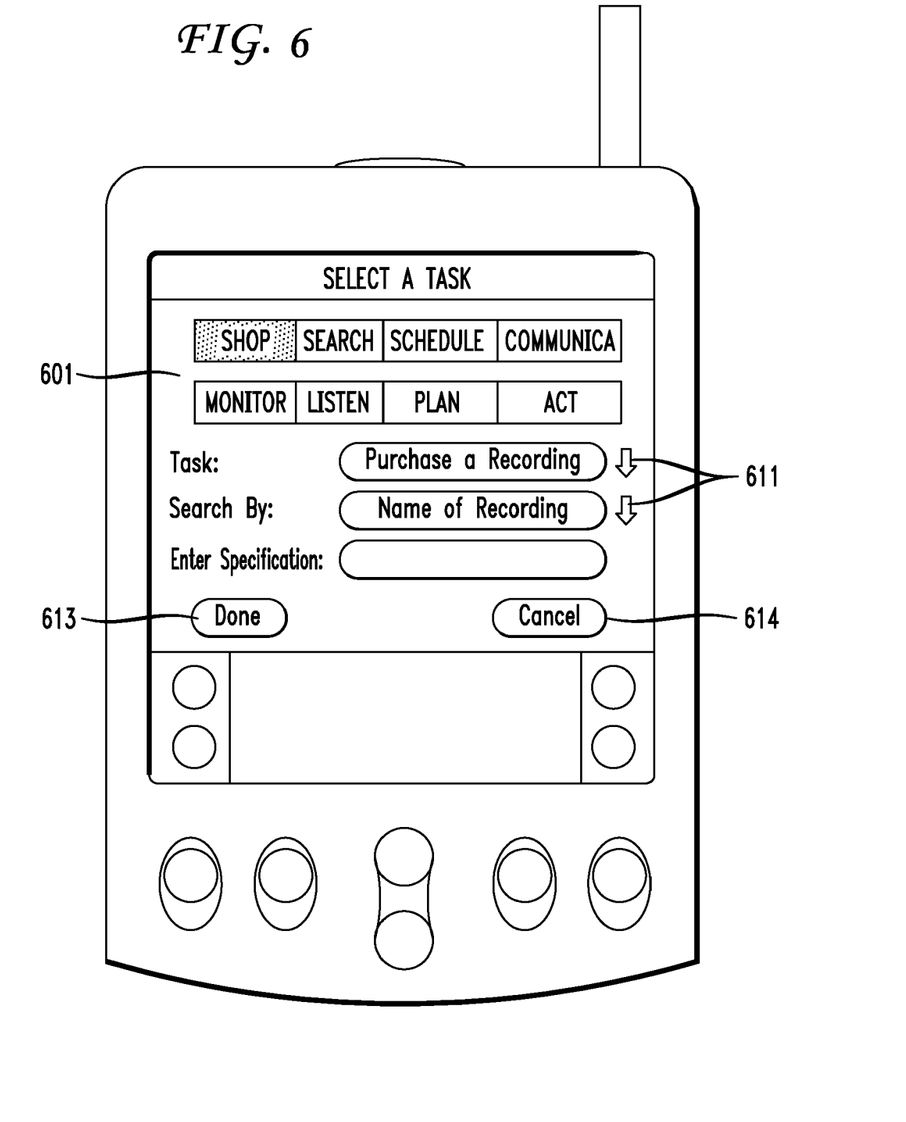
FIG. 6 illustrates one possible implementation of a display in accordance with one embodiment of the present invention.

The task definition window 601, as exemplified in FIG. 6, would then appear. The user specifies the different tasks by clicking on one of the different categories listed on the top of the window. In this illustration, Shop has been selected and the window's popup menus and text entry boxes allow the user to specify which kind of shopping task to perform; in this case, search for a CD. In this example window, the boxes labeled with arrows, 611, have pull down menus associated with them. The user could select other Shopping tasks by clicking on one of the arrows 611. By clicking on the lower of arrows 611, the user can select how to search for the recording. In the case depicted in FIG. 6, the option "Name of Recording" is selected.

Figure 7:
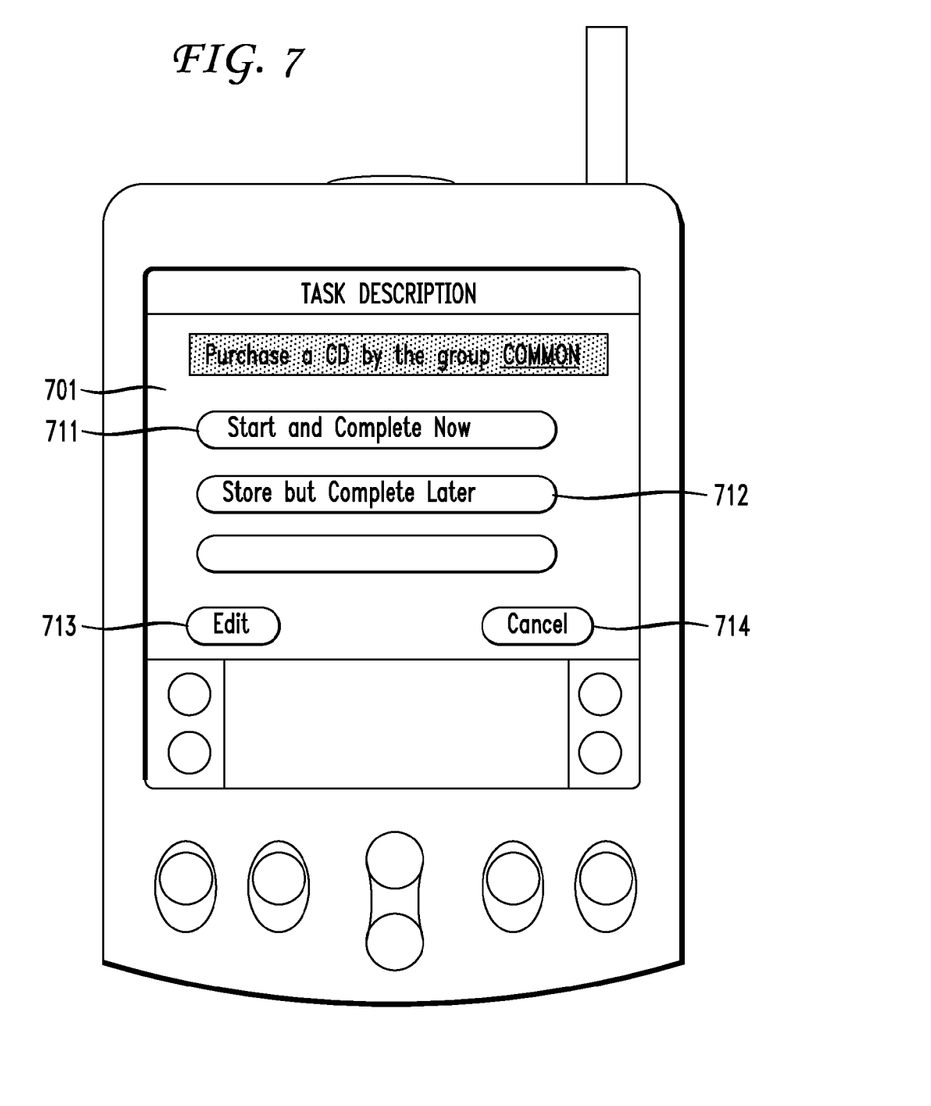
FIG. 7 illustrates one possible implementation of a display in accordance with one embodiment of the present invention.

Clicking "Done" button 613 results in the construction of a new task description. In this case, after clicking on the "Done" button, the user would see the task description menu 701 as illustrated in FIG. 7. A "Cancel" button 614 is also shown.

Clicking on "Edit" 713 or "Cancel" 714 do the obvious things. Clicking on "Store but Complete Later", 712, would cause an initiate message to be generated and queued for later transmission to the Personal Agent Server (PAS). Clicking on "Start and Complete Now", 711, would generate an initiate message that would be transmitted immediately to the PAS.

On the PAS an agent will be constructed to handle that task. As the task is executed, a URL will be constructed to query each of the selected sites, and results from those queries will be processed (e.g., by collating results from multiple sites) and the results submitted to the user via a result message.

The PAS creates a Personal Agent (PA) to handle the task based on information contained in the task description. A set of rules for query modifications is run using preference information contained in the task description. The URLs are then submitted to the appropriate sites.

The PA collates results from each of the site queries and submits them back to the user in result message. In this example, the result would consist of a page containing prices for the requested CD from the websites queried. Then the user selects to buy one of the choices. This is submitted back to the PA, which would then pass the URL request to the specific site selected for the purchase. The PA would fill form URLs returned from the purchase site. Once the transaction completes, the confirmation page would be saved as in the result set R of the task T.

Figure 10:
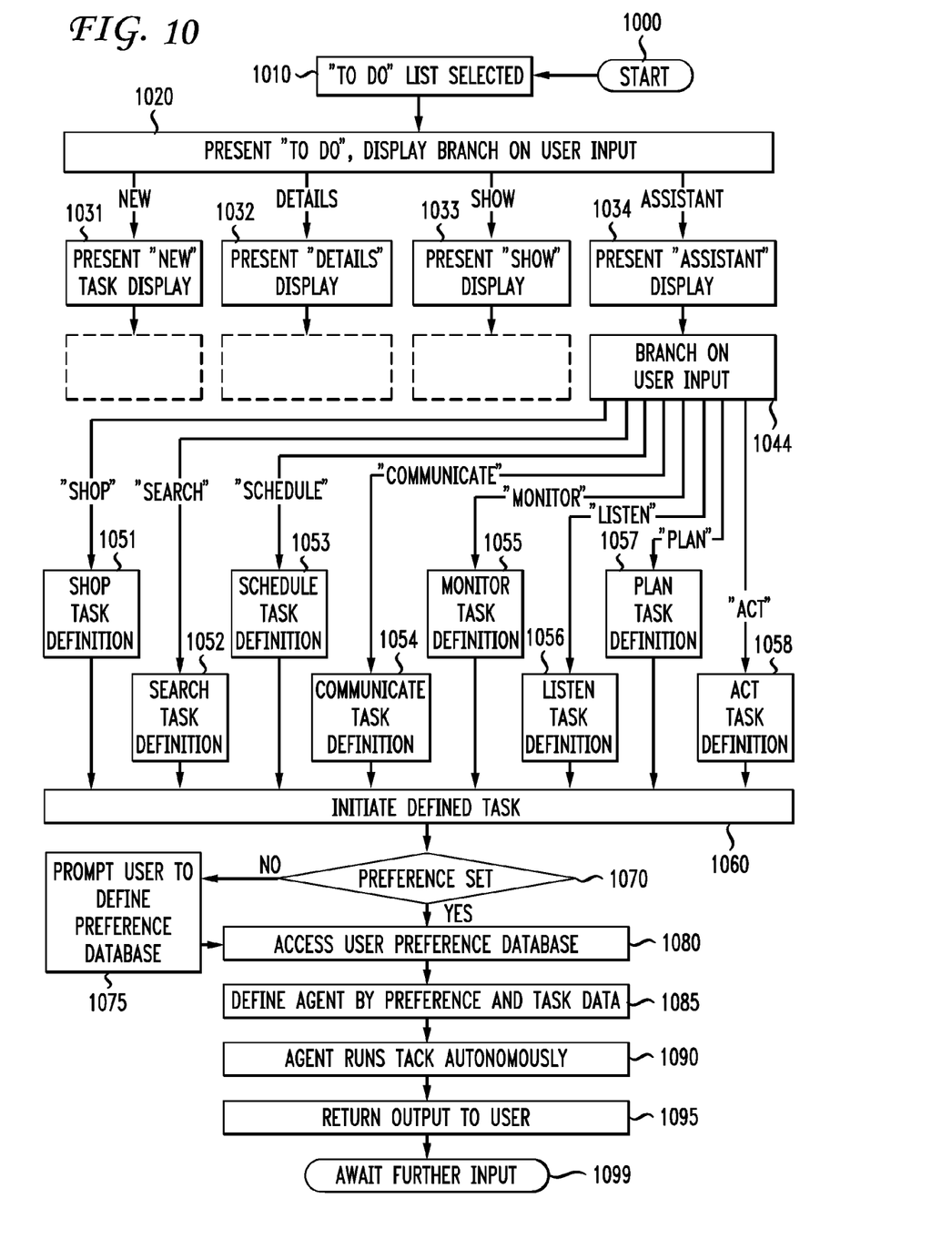
FIG. 10 is a block diagram illustrating an example of an operation in an implementation of one embodiment of the present invention.

Another illustration of a task process can be viewed in FIG. 10. In this illustration, a portion of the "To Do" list process outlined above is shown as process 1000. As was noted above, the "to do" list is a common PIM application that serves well to illuminate the concepts presented by this embodiment of the present invention. It is not meant to be the only application used in view of this embodiment nor is any other particular application. Similarly, personal information management is not meant to be the only area to which the software task assistant can be applied. It is used herein merely to provide illustration.

When the user selects the "to do" list, 1010, the display for that PIM application is presented. In the display, it is expected that user input buttons, similar to those shown in FIG. 6 as "NEW", "DETAILS . . . ", "SHOW . . . " and "ASSISTANT . . . ", will be presented in order to prompt the proper user input. On selection of a button, 1020, a follow-on display is shown, possibly similar to that shown in FIG. 7. In FIG. 10, the example shown is the presentation of the "ASSISTANT" display, 1034. As in the previous display, there are likely to be buttons shown for prompting user input via the touchscreen found on many PDAs. The buttons selected serve to define the task that will be executed after user initiation. According to the example of FIG. 10 (blocks 1031, 1032 and 1033, respectively), a "NEW" display, a "DETAILS" display, or a "SHOW" display may instead be presented depending on the task selected by the user in block 1020. Within the display presented, in block 1044, the user makes other selections (refer to the discussion of FIG. 6, for example). When a task type is selected, further buttons and prompts appropriate to each previous selection are presented and each user input further defines the task to be performed, 1051-1058. When the task is sufficiently defined, the user initiates the task, 1060, possibly via an window such as that shown in FIG. 8. That display shows the result of task definition and user initiation could be selected by clicking the appropriate button.

Initiation sends the task definition to the PAS, the personal agent server where the agent is defined by the task description, task data and user preference. The PDA would likely be able to prompt the user for preferences, 1070, if none were available in the preference database for the particular task at hand.

Figure 8:
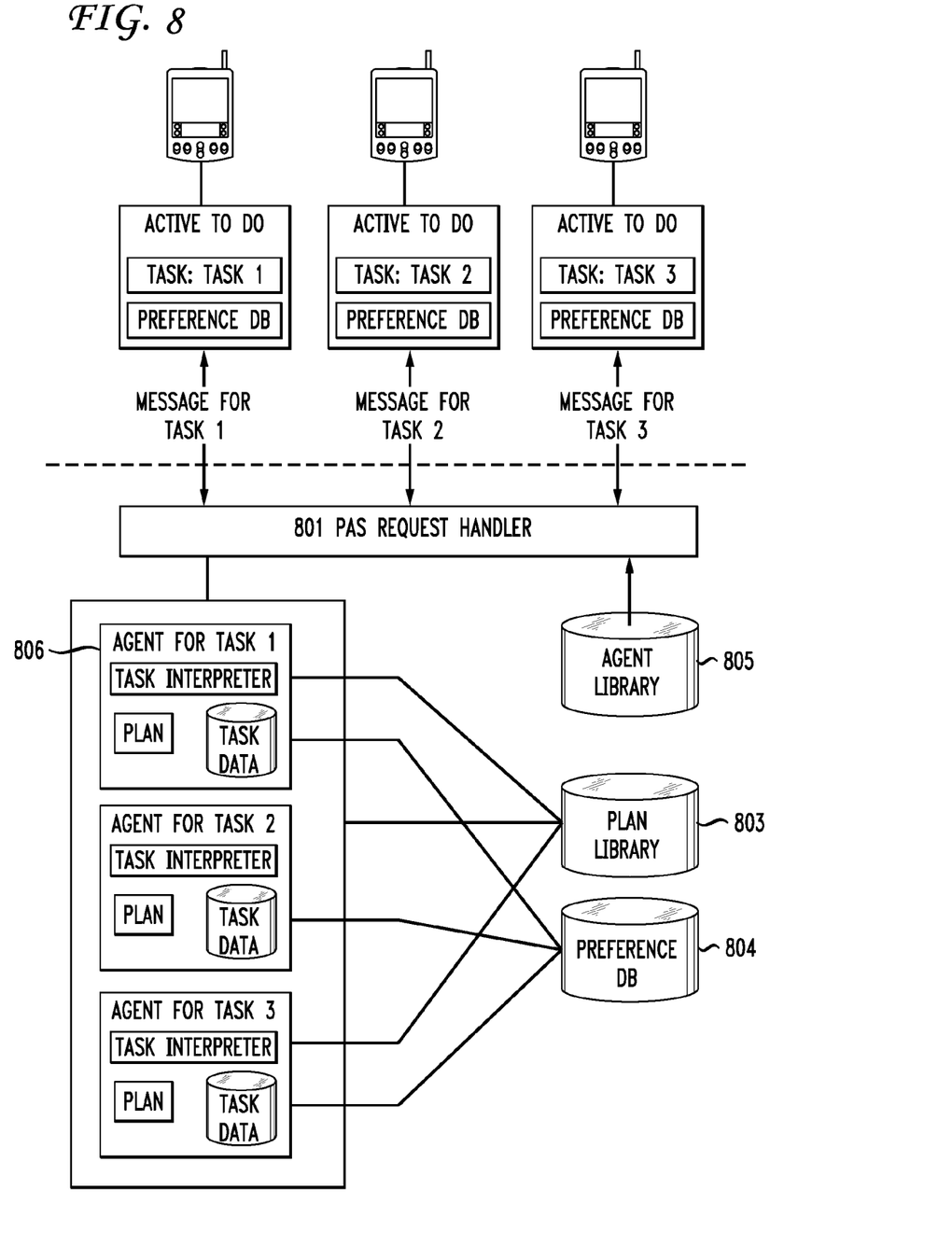
FIG. 8 illustrates, in block diagram form, a possible implementation of task assistants in accordance with one embodiment of the present invention.

The agent would then be defined, 1085, using the preferences in the database, 1075 and 1080, the task description from present user input, and task data stored in the agent library 805 of FIG. 8 and the task plan library 803 of FIG. 8. It must be noted that these entities may be implemented in a number of ways and are not limited to any particular form factor.

The agent then runs the task autonomously, 1090, meaning that no further user input is required until the task is complete. The result may be returned to the user, 1095, at a time specified in the initial task description or at a time determined by some other requirement, perhaps driven by the entities with which the agent must communicate in order to complete the task. At that point, depending on the nature of the task, further input may be awaited or the session may be terminated, 1099.

It must be noted that no operation or step listed above is definitive of limits to this embodiment of the present invention. Each of the steps, displays and operations discussed is presented in order to more readily explain the concepts presented herein.

Software Components for Agent-Assisted Web Interaction

Primary software components of an Active TO DO List are discussed herein by way of example of this embodiment of the present invention. No inference should be taken that a To Do list or any other PDA application is the only application, or even the primary application, that could benefit from agent-assisted web interaction.

Included in the To Do List application of this embodiment are the following software components: Client TO DO List application, Personal Agent Server and "Softbots".

The client TO DO List application (on the mobile device) collects task description information from the user and on applicable device databases (e.g., address book) and creates a task description to submit to the PAS. The Personal Agent Server, located on a Proxy Server, processes the task request and initiates personal agents (PA)s and other softbots. Softbots are web-based, semi-autonomous, operators that implement tasks. They include Personal Agents (PA's) generated by the PAS as well as other softbots capable of performing other services.

FIG. 8 shows major software components of the architecture. The user interface of this application allows the user to construct one or more task descriptions and each of these descriptions is stored in the database of this application. Preference information contained on the device, along with information contained in other PIM databases (e.g., the datebook) is used to add more information to the task description. Messages from the application to the PAS are generated in response to user interface commands (e.g., when "Start and Complete Now" button 711 of FIG. 7 is clicked.)

Note that the illustrated entities in FIG. 8 are software entities. Their implementation could be in any number of ways in the various hardware devices available throughout the Internet infrastructure.

The PAS Request Handler 801 receives the message and determines how to process it. When a request to initiate a new task is received, the Request Handler creates an Agent Object 802 to handle that task. These are retrieved from the Agent Library 805. Once it is created, the agent selects the appropriate plan (or alternatively a set of rules) from the Plan Library 803 that specifies how to perform its task. Preference information stored in the Preference Data Base 804 is used to specialize the task, along with the information contained in the task description. The Agent (e.g., 806) is assigned an identifier that uniquely associates it with the task (e.g., Task 1) defined in the original message. Some of the complex tasks discussed earlier require the execution of subtasks. Subtasks are created in the same manner as main tasks: the PAS Request Handler 801 creates an appropriate Agent for handling that task and the Agent selects an appropriate plan from the Plan Library to complete the task. The Agent that invoked the subtask can then use the communication protocol presented earlier to examine or modify data local to the subtask Agent, or also suspend or activate the subtask Agent as necessary.

When other task messages are received from the device, the PAS Request Handler uses the task identifier to route that message to the Agent assigned to that task. Messages sent from the Agent to the application are routed through the PAS Request Handler.

The Personal Agent Server Architecture

The PAS is a logical entity that can be implemented as an independent personal server running on a PC (the distributed model) or co-located with a general-purpose server or a public web server. "Personal agent" refers to the fact that the architecture treats each person differently, compared with a generic proxy server. Below, a common wireless palmtop device and a supporting network architecture are used as the examples to describe the PAS.

Figure 9:
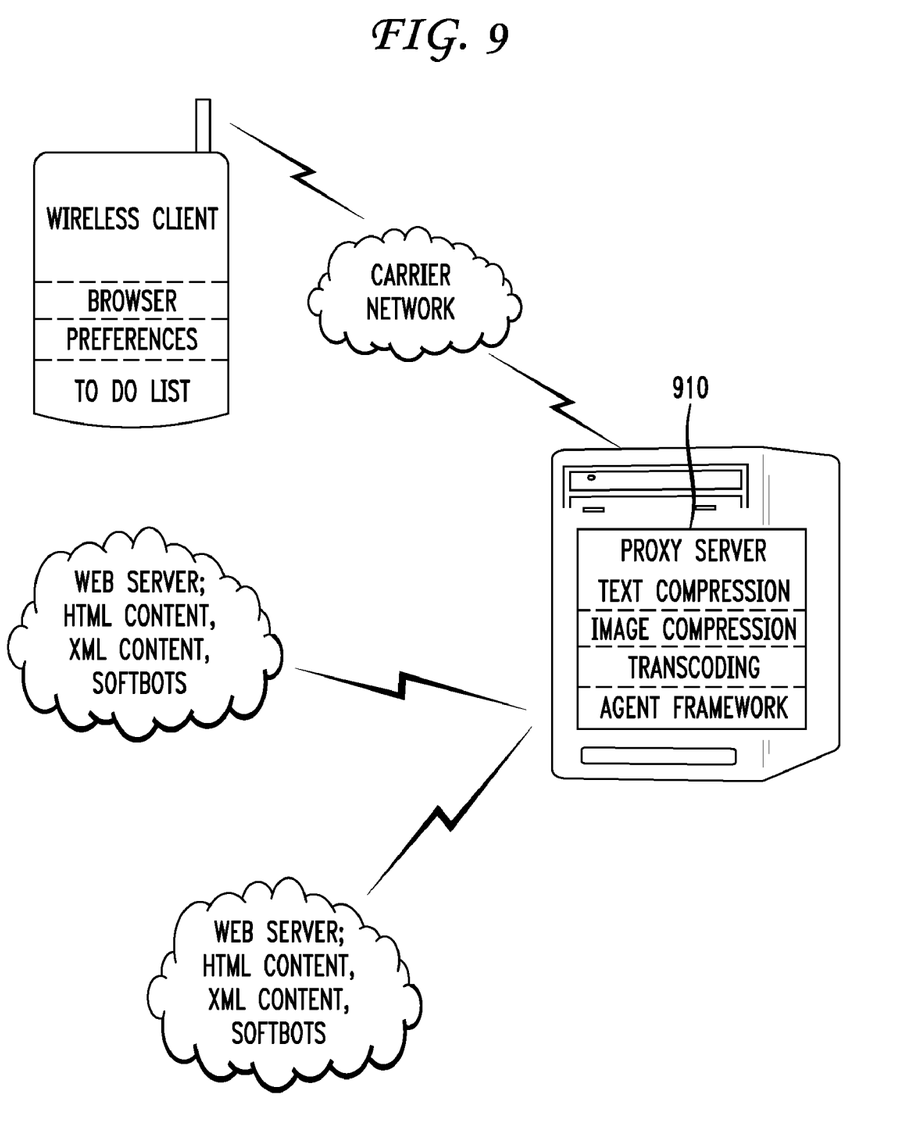
FIG. 9 illustrates an exemplary implementation of a proxy server in accordance with one embodiment of the present invention.

FIG. 9 illustrates an exemplary PAS co-located with a generic proxy server, 910. Generic Proxy Servers provide such functions as data compression and customer account billing.

The Personal Agent Server is implemented, in this embodiment of the present invention, as an agent framework that is capable of launching other agents. There are four architectures that can be used to implement the PAS.

The first is a simple, rule-based, Framework. While other architectures may be implemented equally as well, there are non-proprietary agent architectures that could provide functionality for agent definition and for simple rule based inference. The Agent Library would be implemented using a basic agent class definition. Plans for doing tasks would be described in the rule representation defined in that architecture.

Another possible architecture is a Reactive Plan Execution Architecture. A reactive plan execution system could be extended to define the plans that the Agents would execute and this approach could be used to define the PAS Request Handler and the Agent Task Interpreter. The rule processing needed to resolve conflicts among tasks is addressed in these systems.

Alternatively, an agent class could be defined for each task type. Spawning of agents, for handling main tasks as well as subtasks, could be handled by a distributed service discovery mechanism such as that provided through the Sun Jini API. Monitoring and coordinating of subtasks could be handled through using a distributed software coordination API such as JavaSpaces or Tspaces.

A third and fourth architectures are Blackboard Control Architecture and Soar architecture. Blackboard architecture could be used to implement control of the Agents. Soar is a flexible rule based architecture that could be used to implement the control of the PAS. Soar, among other things, allows flexibility in the way in which conflicts among rules are resolved.

PAS Capabilities

The ability to filter content based on user preferences is a critical aspect of personalizing the web. Preferences are expressed as a set of constraints $c_i$ on the parameters $p_i$ of a task. Each preference is formally expressed as a "4-tuple" predicate, variable-name, value, importance) where "variable-name" is some task specific parameter (i.e. one of the $p_i$). The value is just a value associated with that parameter. Here predicate is some relation on the value and, variable-name. The importance is a number to express how important it is that the constraint be. The PIDL language is used to express constraints in implementation. Examples of useful preferences include Site preferences and a family of "E-Commerce" preferences which would also include payment, delivery and merchant preferences, and Travel preferences which could include mode and vendor preferences. A rule-based mechanism would be used for figuring preference information into the execution of any web-assisted task.

A personal agent server can also serve as a personalization and filtering entity for mobile devices. The PAS can intercept and alter web content in the following ways: filter tagged text to remove items which do not fit the user's interest profile; launch a web-based search to find items of interest; aggregate the results of multiple web-based searches; prioritize and order the results of multiple web-based searches (e.g., a search using two different search engines might rank as highest relevance all of the articles found by both search engines); toggle images; bundle separate tasks to achieve a single goal (e.g., browse, sample music, buy); supply personal and confidential information for transaction-based web interaction The capabilities that need to be designed into the PAS are a function of the applications to be supported and the flexibility needed for web-based assistance. The previous section, "The Personal Agent Server Architecture", describes how Search, Shop, Monitor, Listen, Schedule, Communicate, Plan, and Act tasks can be defined and implemented using plans, rules, softbots, or combinations thereof. The range of possible tasks that could be implemented using the PAS is not limited to the types listed above, which making achieving a result difficult, and sometimes result in re-planning.

With this or other embodiments of the present invention, a method and means have been disclosed that enormously enhance the user's power when web access is exploited by way of a personal wireless palmtop computer.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for enhancing wireless access to a remote computer network, comprising:

receiving a selection of a task in a portable computing device;

receiving user input via a user interface particular to said task, said user input further defining said task; and, sending said user input to a server in said computer network, said server automatically executing said task in said computer network by use of a software task assistant, wherein a result of said executing is filtered according to a previously stored user-defined preference before said result is forwarded from said server to said portable computing device, the previously stored user-defined preference including a variable name for a variable value, a constant value associated with said variable name that constrains said variable value according to a predicate that defines a relationship between said variable value and said constant value, and a priority value indicating a relative importance of said user-defined preference.

2. A method as in claim 1 wherein said sending to said server is by use of a wireless connection.

3. A method as described in claim 1 wherein said software task assistant resides in a part of said remote computer network.

4. A method as described in claim 1 wherein said computer network is connected to an Internet.

5. A method as in claim 1 wherein said task is related to a personal information manager resident in said portable computing device.

6. A method as in claim 1 wherein said software assistant is enabled to perform said task automatically and autonomously.

7. A method as in claim 1 wherein said task is capable of being performed by said software task assistant.

8. A method as in claim 1 wherein said task is an online purchase.

9. A method as in claim 1 wherein said task is an online information search.

10. A method as in claim 1 wherein said task comprises multiple tasks.

11. A method as in claim 1 wherein said task comprises a structured task list.

12. The method of claim 1, wherein the user-defined preference is associated with said task.

13. A computing device comprising:

a display device;

at least one processor;

a storage for storing instructions and data; and a bus connecting the display device, the at least one processor, and the storage to permit communications therebetween, wherein the computing device is configured to:

receive a selection of a task from a user, present at least one particular display to the user, the at least one particular display being at least partly based on the task selected, receive input from the user via data entered by the user in response to presenting the at least one particular display, send the received input to a server in a computer network for the server to invoke the task based on the received input, and receive a result of the invoked task from the server, the received result having been filtered based, at least partly, on previously stored user-defined preference data.

14. The computing device of claim 13, wherein the user-defined preference data includes a variable name for a variable value, a constant value associated with said variable name that constrains said variable value according to a predicate that defines a relationship between said variable value and said constant value, and a priority value indicating a relative importance of said user-defined preference data.

15. The computing device of claim 13, wherein the computing device is further configured to:

receive the user-defined preference data from a user, and send the user-defined preference data to a device in the computer network for storing.

16. The computing device of claim 13, wherein the selected task includes one of shopping, searching, scheduling, communicating, monitoring, listening, planning, or acting.

17. The computing device of claim 13, wherein the selected task includes making an online purchase.

18. The computing device of claim 13, wherein the user-defined preference data is associated with said task.

* * * * *